United States Patent [19]
Suka

[11] Patent Number: 5,824,709
[45] Date of Patent: Oct. 20, 1998

[54] METHOD FOR RECYCLING WASTE PLASTIC MATERIAL CONTAINING STYRENE POLYMER

[76] Inventor: Motoshi Suka, 12-10, Higashi 2-chome, Kunitachi-shi, Tokyo, Japan

[21] Appl. No.: 674,664

[22] Filed: Jul. 2, 1996

Related U.S. Application Data

[63] Continuation of Ser. No. 340,618, Nov. 16, 1994, abandoned.

[51] Int. Cl.⁶ ..................................................... C08J 11/04
[52] U.S. Cl. ................................. 521/47; 521/41; 521/46
[58] Field of Search .................................. 521/41, 46, 47

[56] References Cited

U.S. PATENT DOCUMENTS

| | | | |
|---|---|---|---|
| 4,196,105 | 4/1980 | Kubat et al. | 521/47 |
| 5,147,894 | 9/1992 | Bopp et al. | 521/47 |

OTHER PUBLICATIONS

CA 109:39,006; Dec. 1987.
JP 06,316,646; Nov. 15, 1994; World Patent Index Ascession No. 95–032853.

Primary Examiner—John M. Cooney, Jr.
Attorney, Agent, or Firm—Wood, Phillips, VanSanten, Clark Mortimer

[57] ABSTRACT

A waste plastic containing a polymer such as polystyrene polypropylene or ABS resin is dissolved in a solvent to form a solution of the waste plastic at an elevated temperature. The solution is filtered to remove labels or other adhered foreign debris. The filtrate is heated to a temperature of 200°–300° C. under a pressure of 1–75 torrs to remove the solvent by evaporation, and the resulting plastic melt is extruded into pellet whereby the waste plastic is recovered. On the other hand, the solvent separated by the vacuum-evaporation is condensed by a water-, brine- and/or refrigerant-cooled condensers, refined by a vacuum-evaporated and recycled to use it as a solvent for the incoming subsequent waste plastic. The pelleted styrene recycle product is free of debris such as labels and accordingly has a good color. Moreover, this recycle product has a good transparency when the waste plastic is transparent.

8 Claims, 1 Drawing Sheet

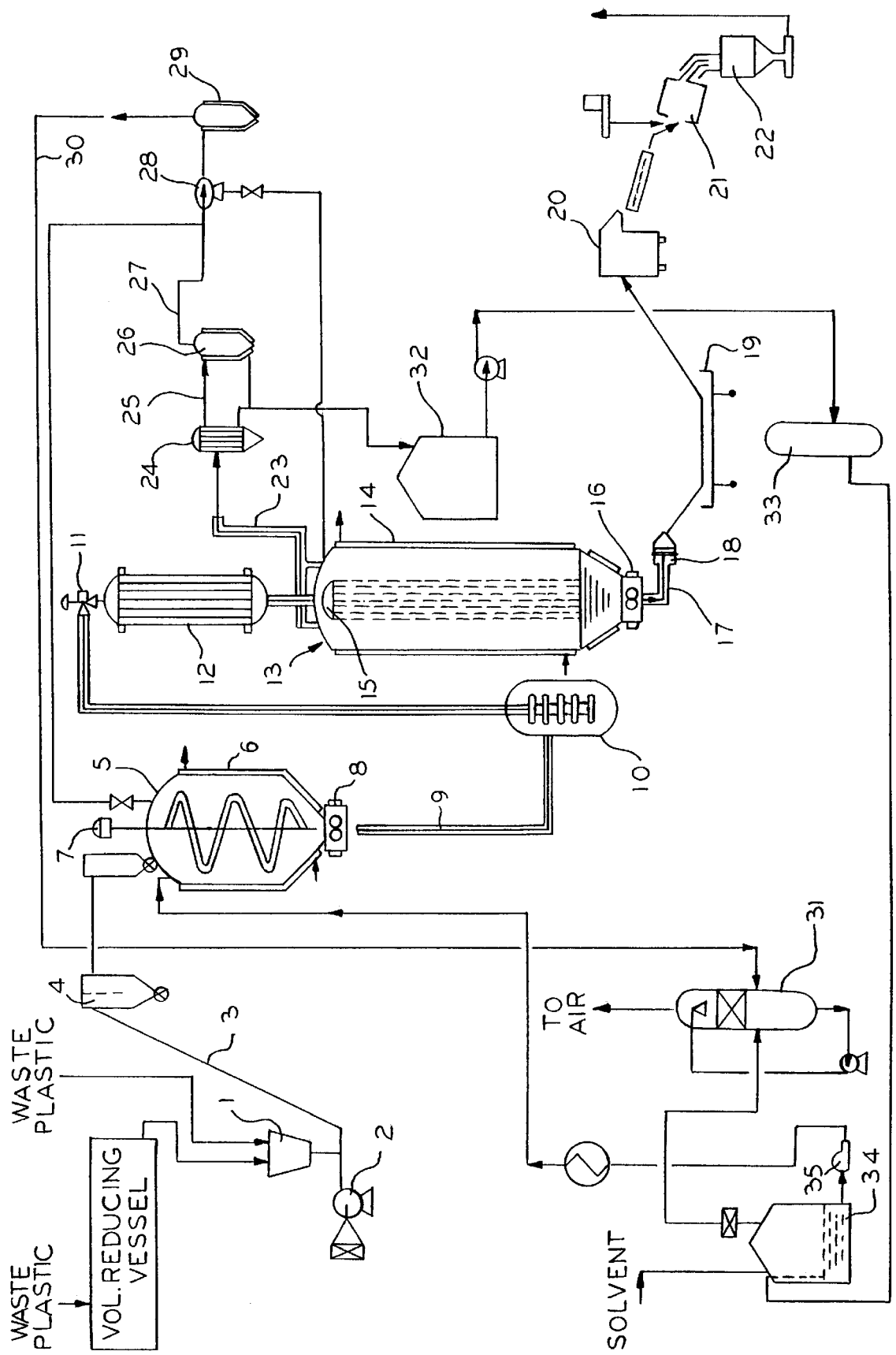

METHOD FOR RECYCLING WASTE PLASTIC MATERIAL CONTAINING STYRENE POLYMER

This application is a continuation of application Ser. No. 08/340,618, filed Nov. 16, 1994 which is now abandoned.

BACKGROUND OF THE INVENTION

1. Field of the Invention

The present invention relates to a method for recycling plastic products and more particularly to a method for recycling polystyrene, ABS resin and polypropylene products.

2. Prior Art

Synthetic resins have been widely used for producing plastic products, packaging containers and packaging materials for foods, clothings and other variety of products. Use of certain plastic materials does necessarily result in generation of an amount of waste plastics from factories, product distribution systems and users. In recent years, the amount of production of plastic materials is more and more increasing to meet the consumers' demand in the market for ever-increasing variety and amount of plastic materials which leads to unavoidable increased generation of waste plastics as industrial and home wastes in every place and the processing of the wastes is a heavy burden on the manufacturers, the distributors and the communities.

Most of the industrial wastes have been buried in the ground or otherwise processed by the waste processors, whereas the home wastes have been incinerated at waste disposal facilities or buried in the ground by the communities.

Plastic wastes are sources of air and underground water pollution and disposal of waste plastics often causes environmental pollution.

Accordingly, recycling of the plastic wastes in one way or other will greatly contribute to benefit of the society.

Recycling of waste plastics by regenerating and reusing the plastic materials has been tried on some plastic materials among the plastic wastes. For example, from supermarkets or other fresh food markets, styrene resins such as foamed polystyrene used for packaging have been recovered in a large scale. Also, from the product distributors who handle word processing machines or other electronic machines or parts of automobiles, waste plastic of ABS resin has been recovered in a large amount. Also, the manufacturers of these packaging materials, electronic machines and automobiles are sources of large amount of waste plastic materials. Polypropylene resin is also similarly used in these areas.

The conventional recycling methods for recovering plastic materials such as polystyrene, ABS resin or polypropylene from waste plastics utilize their property that they are capable of being molten at two hundred and several tens degrees centigrade, wherein the waste is washed with water, dehydrated, ground into powder, subjected to screening or compaction, melt-extruded and then formed into pellets. Foamed polystyrene is a relatively pure material and accordingly is best suited for recycling among all kinds of synthetic resins. However, as it is not easy to remove labels or other foreign objects adhered to the surface of the polystyrene articles by the first washing, it is normal practice to use man power to manually remove them before washing step. For example, a man power of six men is required for processing at a rate of about 250 kg/h . Moreover, it is often required to exchange the screen due to clogging of the mesh of the screen. In the case of ABS resin or polypropylene, metal pieces or plating films are often contained in the resins and thus the matallic materials must be first removed by hand working before the resins are recovered.

Therefore, a principal object of the present invention is to overcome these difficulties of the conventional method and to provide a novel method for economically recover thermoplastic polymers such as polystyrene, ABS and polypropylene from plastic wastes containing one of them to provide a recycled product of good quality.

BRIEF SUMMARY OF THE INVENTION

Accordingly to the present invention, waste plastic containing a thermoplastic polymer selected from the group consisting of styrene polymers such as polystyrene, ABS resin and polypropylene, which has been collected from the various sources of wastes is dissolved in a solvent to form a solution of the plastic waste at an elevated temperature, filtering the solution to remove labels or other adhered foreign debris, heating the filtrate to a temperature of 200°–300° C. under a pressure of 1–75 torrs to remove the solvent by evaporation, and melt-extruding the resulting plastic melt into pellets whereby the waste plastic is recovered. On the other hand, the solvent separated by the vacuum-evaporation is condensed by a water-, brine- or refrigerant-cooled condenser and refined by a vacuum-evaporated and recycled to use it as a solvent for the incoming subsequent waste plastic. The pelletized plastic recycle product is free of debris such as labels and accordingly has a good color. Moreover, this recycle product has a good transparency when the waste plastic is transparent.

BRIEF DESCRIPTION OF DRAWING

The single drawing illustrates a flow sheet of an example of the system for performing the method according to the present invention.

DETAILED EXPLANATION OF THE INVENTION

Waste plastic material containing polystyrene, ABS resin or polypropylene which has been collected from the various sources is first fed to a crusher 1. If the waste plastic is ABS resin or polypropylene from casings for electronic machinery or implements or automobiles they are washed with water, dehydrated and dried before they are put into the crusher 1. In the case of foamed polystyrene, the waste is first put into a volume reduction vessel which is heated to a predetermined temperature to reduce the volume in order to increase the efficiency of dissolving bath. The crushed or ground waste plastic is sent to a classification separator 4 by way of a conduit 3 by air pressure generated by a blower 2. Sands, metals or other materials having greater specific gravities than the plastic materials in the waste plastic are separated. The separated plastic content is then introduced into a dissolving bath 5 which is enclosed by a jacket 6 and has a motor-driven agitator 7 having one of more screw vanes within the dissolving bath, which is heated and kept at room temperature to 75° C. by passing a heating medium through the jacket 6.

A solvent is introduced into the dissolving bath 5 from a solvent tank 34 by a pump 35 for dissolving the plastic powder supplied. This solvent is selected from those appropriate for dissolving the plastic powder and preferably having a boiling point of 75°–175° C. at the normal pressure. If the plastic material to be recovered is polystyrene, toluene and ethylbenzene are the most preferred. The quantity of the solvent to be introduced is generally in the range of 10–50 wt % based on the weight of the plastic material.

In the dissolving bath 5, by maintaining the mixture of the resin powder and the solvent to and kept between room temperature to about 75° C. with agitation, a solution of the mixture is formed. The resin solution is pressurized with a gear pump 8 and sent by way of a double conduit 9 to a leaf filter device 10, where non-soluble materials are removed and the resin solution now free of foreign materials is sent to an automatic or manual needle valve 11 which is automatic or manual valve, by which the pressure of the resin solution is reduced to a low pressure. The filtrate resin solution is then preheated by a multi-tube heat exchanger 12 and then introduced into a vacuum-degassing vessel or devolatilizer 13. The vessel 13 is encircled by a jacket 14 through which a hot heating medium is circulated in order to maintain the vessel 13 at a temperature of 200°–300° C. The resin solution entering the vacuum-degassing vessel 13 is sprayed with an inlet nozzle 15 into the vessel 13 and descends within the vessel 13. As the vessel 13 is maintained at a high temperature and under reduced pressure of 1–75 torrs, preferably 30–50 torrs, the solvent in the sprayed and descending resin solution is almost completely evaporated and thus the resin solution now consisting substantially of 100% resin melt is collected to the bottom of the vessel 13 by gravity.

The resin melt collected in the bottom of the vessel 13 is pressurized with a gear pump or screw pump 16 and is fed via a double conduit 17 warmed with a heating medium to an extrusion die 18 where the resin melt is extruded from a nozzle of the die into strands. The strand-like moldings are then cooled in a water-cooling bath 19 and taken up by a take-up reel and cutting device 20. The strands are then cut into pellets which are then blended with a lubricant, if desired, in a blending device 21 and recovered in a pellet storage 22. The resin pellets are recycled for reuse.

The solvent vapor separated by the vacuum-evaporation vessel 13 is led via double conduits 23 warmed by a heating medium to a water-cooled condenser 24 and then led via a conduit 25 to a brine- or refrigerant-cooled condenser 26, where the solvent is thoroughly condensed and separated. The recovered solvent is collected in a solvent tank 32 and led to a distillation column 33 where the solvent is refined and carried-over resin of lower molecular weight is removed. The recovered solvent is then recycled to the dissolving bath 5 by means of a pump 36 and reused for dissolving the resin powder.

The remaining gases in the water-cooled condenser 24 and brine- or refrigerant-cooled condenser 26 after removal of the condensate from the solvent vapor are sucked via conduits 25 and 27 by a vacuum pump 28 and collected in a gas collector 29 from which the gases are led to a device 31 for removing odor-emitting materials and the gases devoid of the odor-emitting materials are exhausted into the atmosphere.

The invention will now be explained in reference to working examples which are not restrictive but simply illustrative.

EXAMPLE 1

Using a system illustrated in FIG. 1, the temperature of the jacket 6 of the dissolving bath 5 having an effective inner volume of 21 liter was set at 70° C. Foamed polystyrene waste was reduced by heating it to 180°–200° C. to reduce the size and then fed to the crusher 1 from which ground polystyrene powder was fed to the classification separator 4 under the air pressure from the blower 2. 5.6 kg of the foamed polystyrene powder was supplied to the dissolving bath 5 and 2.8 kg of toluene was added with agitation. A polystyrene solution was formed after about 15 minutes.

The resulting solution was then slowly fed to the vacuum-degassing vessel 13 of a size of 10 cm in diameter and 80 cm in height set at a temperature of 230° C. and a pressure of 30 torrs spending 6 hours. The resulting polystyrene melt is withdrawn from the vessel 13 and supplied to the die 18 by way of the gear pump 16 and double conduit 17 and was caused to be extruded through the nozzle. A transparent strand-like molding was obtained. This strand-like molding was then cut with a cutter to form pellets which were colorless similarly to the virgin product pellets.

The condensed coarse solvent collected at the condensers 24 and 26 upstream of the vacuum pump was collected in the coarse solvent tank 32. This coarse solvent was distilled in a distillation column 33 at a temperature of 65° C. under a pressure of 75 torrs. The resulting solvent was sent to the solvent tank 34 for reuse.

EXAMPLE 2

Using a system illustrated in FIG. 1, the temperature of the jacket 6 of the dissolving bath 5 having an effective inner volume of 21 liter was set at 70° C. ABS waste fed to the crusher 1 from which ground ABS powder was fed to the classification separator 4 under the air pressure from the blower 2. 5.6 kg of the foamed ABS powder was supplied to the dissolving bath 5 and 2.8 kg of toluene was added with agitation. An ABS solution was formed after about 15 minutes.

The resulting solution was then slowly fed to the vacuum-degassing vessel 13 of a size of 10 cm in diameter and 80 cm in height set at a temperature of 230° C. and a pressure of 30 torrs, spending 6 hours. The resulting ABS melt is withdrawn from the vessel 13 and supplied to the die 18 by way of the gear pump 16 and double conduit 17 and was caused to be extruded through the nozzle. A transparent strand-like molding was obtained. The strand-like moldings were then cut with a cutter to form pellets which were colorless as similarly to virgin product.

The condensed coarse solvent collected at the condensers 24 and 26 upstream of the vacuum pump was collected in the coarse solvent tank 32. This coarse solvent was distilled in a distillation column 33 at a temperature of 85° C. under a pressure of 75 torrs. The resulting solvent was sent to the solvent tank 34 for reuse.

What I claim is:

1. A method for recovering a thermoplastic polymer from a waste plastic containing the thermoplastic polymer selected from the group consisting of styrene polymers, ABS resin and polypropylene, which comprises:

dissolving the waste plastic in a dissolvent consisting essentially of solvent to form a solution of the waste plastic at an elevated temperature;

filtering the solution to remove foreign debris from the solution;

heating the filtrate to a temperature of 200°–300° C. under a pressure of 1–75 torrs to remove the solvent by evaporation;

extruding the resulting plastic melt into pellets, whereby the waste plastic is recovered;

condensing the solvent separated by the vacuum-evaporation;

refining said condensed solvent by distillation; and recycling the solvent for use as a solvent for dissolving the waste polymer.

2. A method according to claim 1, wherein said styrene polymer is polystyrene.

3. A method according to claim 1, wherein said polymer is is ABS resin.

4. A method according to claim 1, wherein said polymer is is polypropylene.

5. A method according to claim 2 wherein said waste styrene polymer is foamed polystyrene and it further includes a step of reducing the volume by heating said waste plastic before the step of grinding the waste plastic.

6. A method according to claim 3 or 4 wherein it further includes a step of grinding the waste plastic into powder before dissolving the waste plastic in a solvent to form a solution of the waste plastic.

7. A method for recovering a thermoplastic polymer from a waste plastic containing the thermoplastic polymer selected from the group consisting of styrene polymers, ABS resin and polypropylene, which comprises:

dissolving the waste plastic in about 10 wt % to about 50 wt % of a solvent having a boiling point of about 75° C. to about 175° C. and being capable of dissolving the waste plastic to form a solution of the waste plastic at an elevated temperature;

filtering the solution under pressure to remove foreign debris from the solution;

depressurizing the filtrate from said filtration;

heating the filtrate to a temperature of 200°–300° C. under a pressure of 1–75 torrs to remove the solvent by evaporation;

extruding the resulting plastic melt into pellets, whereby the waste plastic is recovered;

condensing the solvent separated by the vacuum-evaporation;

refining said condensed solvent by distillation; and recycling the solvent for use as a solvent for dissolving the waste polymer.

8. A method for recovering a thermoplastic polymer from a waste plastic containing the thermoplastic polymer selected from the group consisting of styrene polymers, ABS resin and polypropylene, which comprises:

dissolving the waste plastic in about 10 wt % to about 50 wt % of a solvent having a boiling point of about 75° C. to about 175° C. and being capable of dissolving the waste plastic to form a solution of the waste plastic at an elevated temperature;

filtering the solution under pressure to remove foreign debris from the solutions;

depressurizing the filtrate from said filtration by passing the solution through a needle valve;

preheating the filtrate using a multi-tube heat exchanger;

heating the filtrate to a temperature of 200°–300° C. under a pressure of 1–75 torrs to remove the solvent by evaporation;

extruding the resulting plastic melt into pellets, whereby the waste plastic is recovered;

condensing the solvent separated by the vacuum-evaporation;

refining said condensed solvent by distillation; and recycling the solvent for use as a solvent for dissolving the waste polymer.

* * * * *